P. A. BANCEL.
SURFACE CONDENSER.
APPLICATION FILED MAR. 2, 1918.

1,354,276.

Patented Sept. 28, 1920.
5 SHEETS—SHEET 1.

WITNESSES:

INVENTOR.
Paul A. Bancel
BY Joseph K. Schofield
ATTORNEY

P. A. BANCEL.
SURFACE CONDENSER.
APPLICATION FILED MAR. 2, 1918.
1,354,276.
Patented Sept. 28, 1920.
5 SHEETS—SHEET 2.
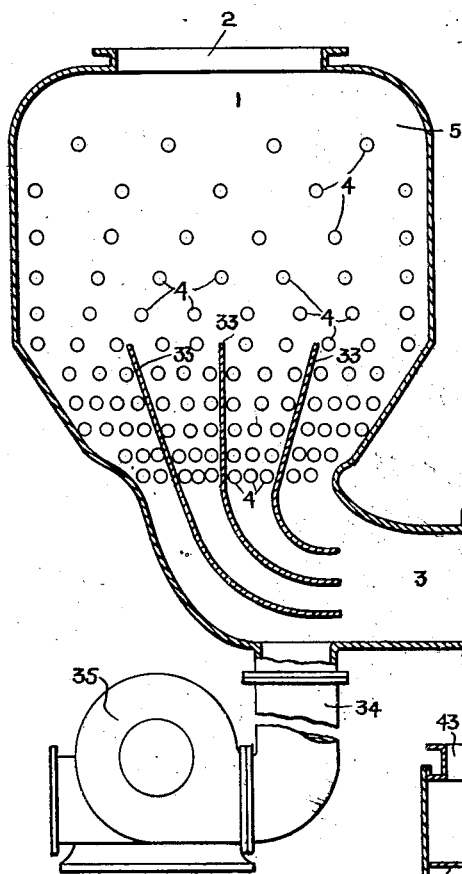
Fig. 3.
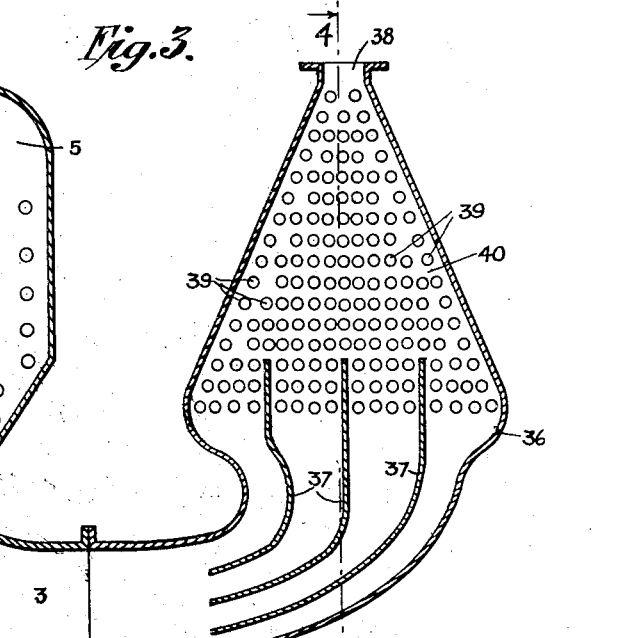
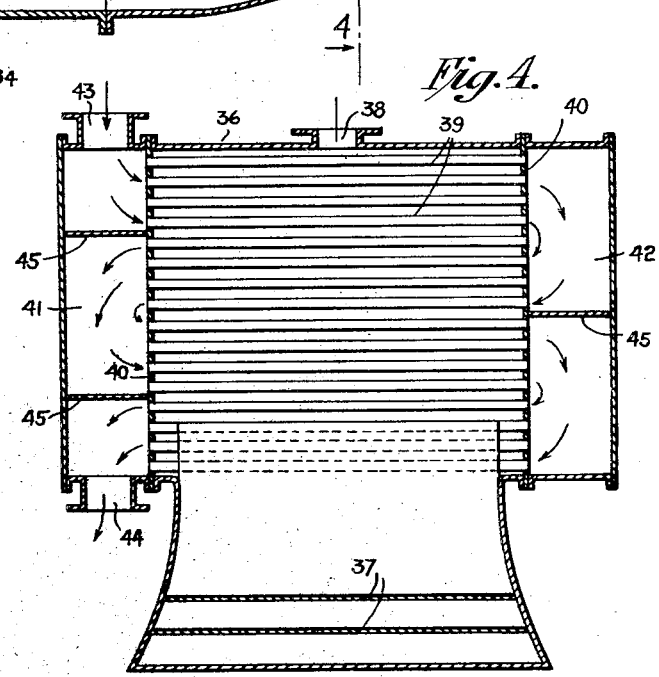
Fig. 4.
WITNESSES:
INVENTOR.
Paul A. Bancel
BY Joseph K. Schofield
ATTORNEY

P. A. BANCEL.
SURFACE CONDENSER.
APPLICATION FILED MAR. 2, 1918.

1,354,276.

Patented Sept. 28, 1920.
5 SHEETS—SHEET 4.

WITNESSES:

INVENTOR.
Paul A. Bancel
BY Joseph K. Schofield
ATTORNEY

P. A. BANCEL.
SURFACE CONDENSER.
APPLICATION FILED MAR. 2, 1918.

1,354,276.

Patented Sept. 28, 1920.
5 SHEETS—SHEET 5.

WITNESSES:

INVENTOR.
Paul A. Bancel
BY
Joseph K. Schofield
ATTORNEY

UNITED STATES PATENT OFFICE.

PAUL A. BANCEL, OF NUTLEY, NEW JERSEY, ASSIGNOR TO INGERSOLL-RAND COMPANY, OF JERSEY CITY, NEW JERSEY, A CORPORATION OF NEW JERSEY.

SURFACE CONDENSER.

1,354,276.      Specification of Letters Patent.      Patented Sept. 28, 1920.

Application filed March 2, 1918. Serial No. 220,081.

*To all whom it may concern:*

Be it known that I, PAUL A. BANCEL, a citizen of the United States, residing at Nutley, in the county of Essex and State of New Jersey, have invented a certain new and useful Improvement in Surface Condensers, of which the following is a specification.

The present invention relates to surface condensers, and more particularly to surface condensers of the type described in my Patent #1,268,074, granted May 28th, 1918, in which the energy expended in forcing the cooling water through the tubes of the condenser is more efficiently utilized by a more effective proportioning of the amount of energy expended in forcing the water through the tubes in various portions of the condenser, a greater amount of energy being expended in forcing the water through the cooling water tubes of the condenser contiguous to the steam inlet where condensation is more active than through those more remote from the steam inlet where little or no condensation takes place in contradistinction to the present general practice of having the water pass through the tubes in all portions of the condenser in a substantially uniform manner, with a substantially uniform expenditure of energy.

The principal object of the present invention is to provide a condenser of such construction that the relative size of the portions of the condenser through which the water is passed with a greater or less expenditure of energy may be simply and effectively varied in accordance with the changes in the conditions of operation in the condenser necessarily occasioned by changes of season, temperature of water, load, air leakage, and other contributing factors.

A further object is to provide a condenser in which the energy expended in forcing the water through the various cooling tubes is utilized still more effectively by the spacing of the water tubes from each other in the condenser in different positions, corresponding, as far as possible, to the amount of energy expended in forcing the water through such tubes; that is, the tubes are spaced wide apart so that the steam can reach at full vacuum, and in full activity, those surfaces which in turn are being cooled at full activity.

A further object is to provide a mechanism which will automatically vary the conditions of flow through the water tubes in the various portions of the condenser as the conditions of operation vary, and at all times utilize the energy expended in causing the water circulation through the tubes in the most effective manner under the prevailing conditions of operation encountered by the condenser.

A still further object is to provide a simple and effective air cooling device for cooling and removing the residual air and gases from a condenser of this type. Another object is to provide means for cleaning the tubes of the condenser if necessary while the condenser is in operation and without dismantling it in any way.

With these and other objects in view, which will hereinafter appear, a condensing mechanism has been devised, specific practical embodiments of which are represented in the accompanying drawings, in which.

Figure 1:
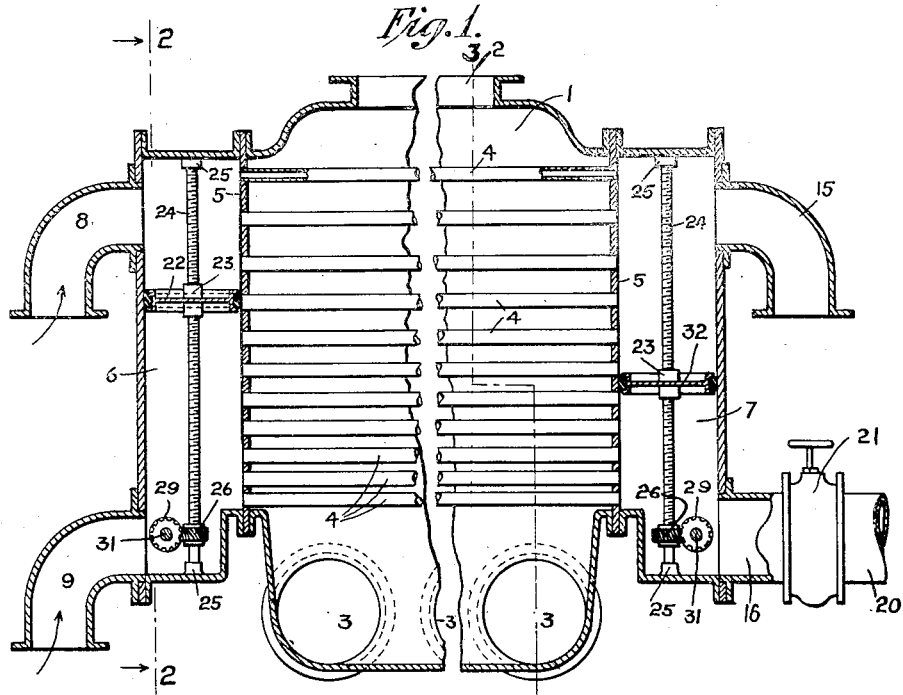
Figure 1 shows a longitudinal section through the condensing chamber proper, of a condenser embodying my invention.
Figure 2:
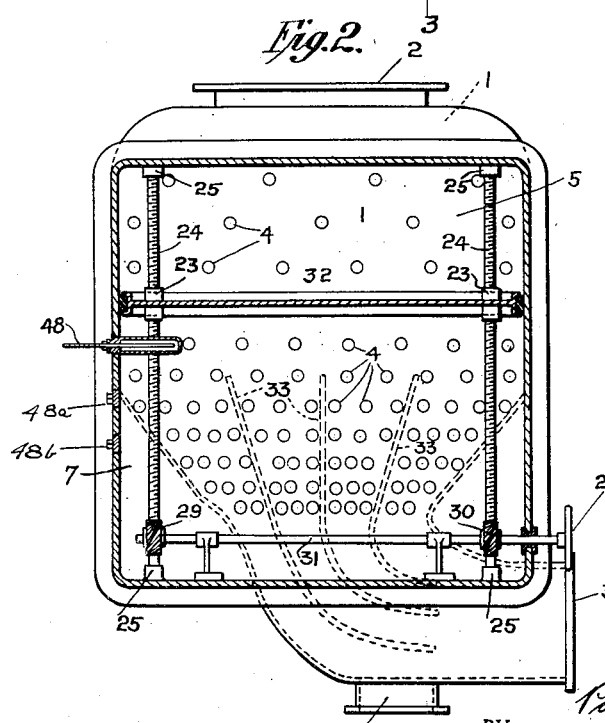
Fig. 2 shows a transverse section on the line 2—2 of Fig. 1.
Figure 9:
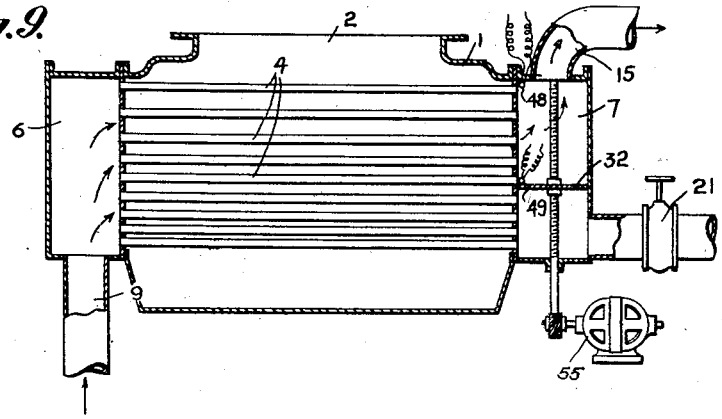
Figure 10:
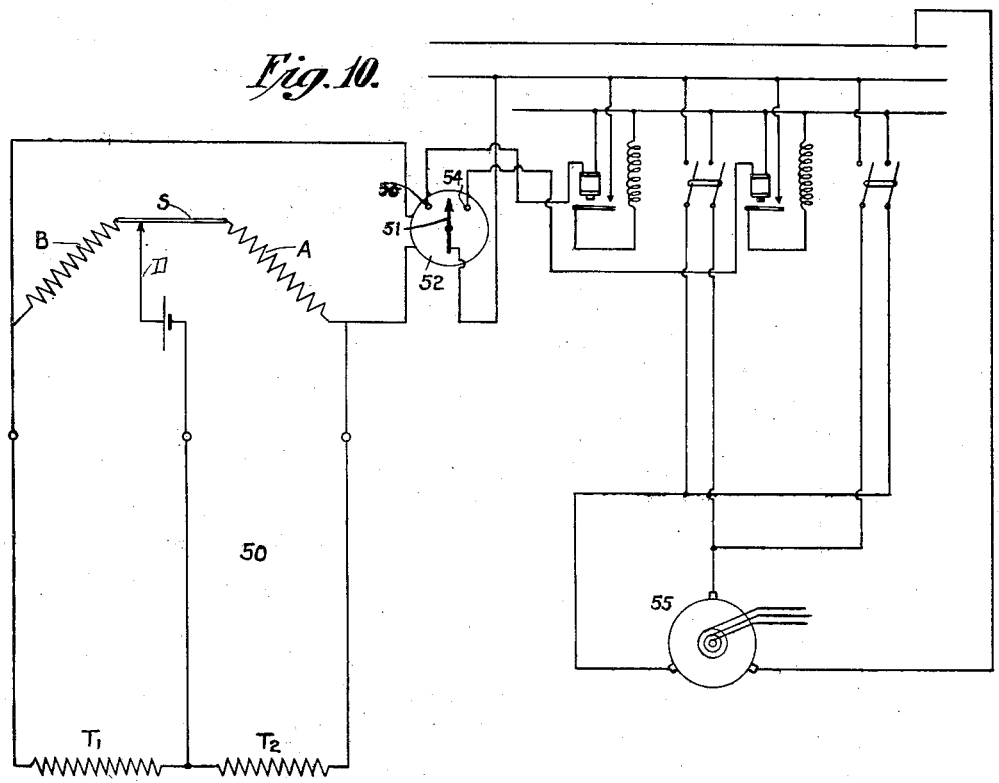

Fig. 3, a transverse section on the line 3—3 of Fig. 1, showing, also, the air cooler, in section;

Fig. 4, a longitudinal section through the air cooler, on the line 4—4 of Fig. 3;

Figs. 5, 6, 7 and 8, diagrammatic representations of the condenser with various parts adjusted to different conditions of operation;

Fig. 9, a diagrammatic representation of a modified form of condenser provided with a mechanism for automatically modifying the flow of water through the various tubes of the condenser to meet various conditions of operation; and Fig. 10, shows the electric circuit in diagrammatic form utilized in the form of the invention shown in Fig. 9.

The principle upon which the condenser shown in the drawings operates may briefly be stated as follows.

In the condensation of steam by passing it over a series of tubes through which cooling water is forced, the tubes nearest the steam inlet have a much greater effect in condensing the steam than those more remote. This portion of the condenser, the nearer portion, which may be termed the "active zone," accomplishes by far the greater part of the condensation, while the part more remote from the steam inlet, which may be termed the "inactive zone," accomplishes a very small proportion of the condensation but acts mainly to lower the temperature of the non-condensable vapors and gases.

The relative size of these zones, the limits of which are not sharply defined, vary with varying conditions, the active zone varying with the amount of steam, with the temperature of the water, and other factors which vary the efficiency of condensation by the tubes. In previous constructions it has been the practice to have the conditions of water flow and other factors of conductivity in the tubes practically uniform throughout the condenser, and therefore to have the energy per unit of tube area expended in forcing the water through the tubes the same in all portions of the condenser.

I have found that the total amount of energy expended in circulating the cooling water through the whole condenser which is a large factor in the operating cost of the condenser, can be much more efficiently utilized if a much greater amount of energy is expended per unit of tube condensing area in forcing the water through the tubes of the more active zone or zones than in forcing the water through the tubes of the less active zone or zones. As a result, I have been enabled to condense a given amount of steam with a smaller expenditure of energy in driving the circulating mechanism, and with a smaller condensing surface, than heretofore; or, by utilizing the same expenditure of energy in a more efficient manner, a greater amount of condensation can be secured with a given condenser.

This result rests on the fact that the higher expenditure of energy in the more active zones per unit of tube area by reason of the production of a higher degree of agitation in the water gives a higher coefficient of conductivity between the tubes and the cooling water where it is most needed.

A practical method of utilizing the higher expenditure of energy in the tubes of the more active zones has been the increasing of the velocity of the flow of water through the tubes in comparison with the velocity of the water through the tubes in the less active zones, and in varying the relative size of the two or more zones as the conditions of operation vary.

In the accompanying drawings is shown a condenser which utilizes the principles of operation outlined above in the manner just described, namely, by having a higher velocity of water through the active zone or zones than through the less active zones, the higher velocities and the consequent increased energy expended producing a greater amount of agitation, and hence, a greater degree of conductivity of the tubes between the cooling water and the steam space.

As shown in the accompanying drawings, the condenser consists of a condensing chamber proper 1, which has a steam inlet 2 on its upper side and steam outlet conduits 3 on its lower side. Horizontally placed in the condensing chamber across the steam flow from the inlet to the outlet, are water tubes 4, of ordinary construction, the ends of these tubes being secured in the ordinary manner in tube plates 5 at opposite ends of the condensing chamber. These tubes are spaced evenly in each row and at lessening distances apart from the inlet to the outlet of the condenser for purposes which will hereinafter appear.

In one end of the condenser chamber casing is a water inlet chamber 6, and on the other end are water outlet chambers 7, the ends of the tubes 4 opening into these chambers and conveying the water through the condenser from one to the other. The inlet chamber is provided with an upper inlet conduit 8 and a lower inlet conduit 9, which are supplied with water by means of pumps 10 and 11 (Fig. 5) driven by motors 12 and 13, the suction pipes of these pumps 10 and 11 drawing water from a suction well 14 or other source of supply. The outlet chamber 7 is provided with two discharge conduits 15 and 16 which lead to a common conduit 18 which conveys the discharged cooling water to a discharge well 19. The discharge conduit 16 is connected to the pipe 18 through a cross conduit 20 which is provided with a throttle valve 21.

Arranged horizontally in the inlet chamber 6 between the inlet conduits 8 and 9 is a partition or deck 22. This partition 22 is provided with nuts 23 at its opposite ends through which pass operating screws 24, the ends of which are journaled in bearings 25 on the upper and lower sides of the chamber casing. Near the lower ends of these operating screws 24 are gears 26 which mesh with gears 29 and 30 on a cross shaft 31. The shaft 31 extends through the wall of the chamber and carries a hand wheel 28, the whole being arranged so that by turning the handle 28 the partition 22 can be moved upward or downward at will. In the outlet water chamber is a similar partition or deck 32 provided with a similar mechanism for raising and lowering it. Below the portion of the condenser chamber 2 traversed by the pipes 4, the condenser casing is turned in a horizontal direction and provided with longitudinal directing plates 33, which distribute the air and non-condensables evenly through the air cooler 36, the water of condensation being removed from the lowest point of the casing through a conduit 34 by means of a pump 35.

The outlet conduits 3 of the condenser are connected to the lower end of a second cooling chamber 36, the purpose of which is to cool and to remove the remaining moisture from the residual uncondensable gases and air which remain after the condensation in the chamber 2. The lower portion of this chamber 36 is also turned horizontally to connect with the lower part of the chamber 2 and is provided with guiding plates 37. The chamber 36 is in the form of a wedge, the upper end where the air is taken out through an air outlet 38 by a pump (not shown) being much smaller than the lower end. Cooling tubes 39 traverse the interior of this chamber 36 in a horizontal direction and are secured in tube plates 40 at opposite ends of the cooling chamber.

Water chambers 41 and 42 are provided on either end of the cooling chamber, water being admitted through an inlet opening 43 from the outlet conduit 16 of the condenser proper and flowing in series through groups of tubes to the water outlet 44, the course of the water being determined by petitions 45 in the inlet and outlet water chambers 41 and 42.

The operation of the condenser depends on the operating conditions, such as the amount of steam and the temperature of the water, this latter being dependent, to a large extent, on the season or latitude, or both. When the cooling water is cold it will be obvious that a higher vacuum can be maintained. With a given quantity of steam entering a condenser and fixed conditions of water supply, air leakage, and vacuum pump capacity, the vacuum attainable increases slightly with increases in the depth to which the steam penetrates into the tube bank. We soon arrive, however, at a condition of equilibrium such that if the steam were pulled through more rows no benefit would accrue. That is, the decrease in condensation owing to the lowering of temperature incidental to the greater resistance to flow against the increased number of tubes is not offset by the condensation on the additional rows it is sought to penetrate. The greater specific volume of the steam at higher vacuum results in greater resistance to flow so that the steam does not penetrate through so many rows in the tube bank. Under these conditions tubes at the farthest part of the tube bank that were before bathed with steam under low vacuum conditions would now be inactive and the active or high velocity water passages should be shortened to agree with this restricted active condensation zone.

Figure 5:
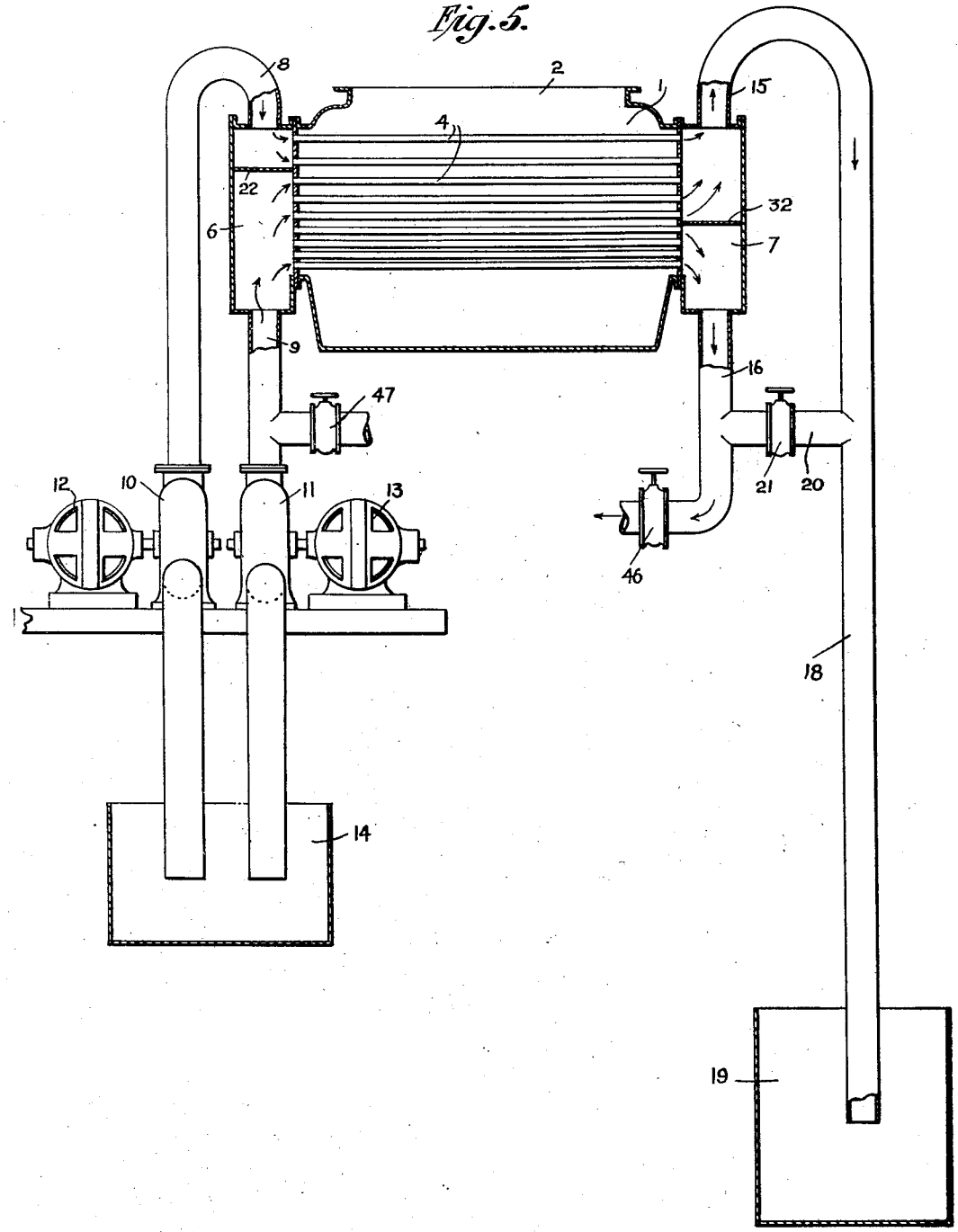

Such a condition is shown in Fig. 5, in which the partition 22 in the inlet chamber is moved up near the top of the inlet chamber and the pump 10 which furnishes the high velocity water can be operated with a comparatively small amount of power. As in most centrifugal pumps, however, the head increases with the decrease in volume, the velocity through the upper tubes will be increased, and thus the condensing efficiency of the upper tubes made still greater, by reason of the greater velocity, making the necessary number of high velocity water tubes still smaller. Below the most active zone, shown in Fig. 5, composed of the tubes through which water is passed from the upper side of the partition 22 is a less active zone, but not of the lowest efficiency. This is composed of the tubes through which the water passes from below the partition 22 to above the partition 32 and into the exhaust pipe 15. Below this is the least active zone of the three in the condenser proper, shown in this modification, which consists of the tubes taking water from the lower part of the inlet chamber 6 and discharging them below the partition 32 through the discharge pipe 16, the velocity of the water through these tubes being decreased over those passing through the zone immediately above by throttling the stream of water by the valve 21, some of the water being passed, if desired, through the valve 46 to the inlet 43 of the cooler, by a connection (not shown).

With this arrangement of the partitions 22 and 32 we thus get three zones; an active zone with high velocity water in the upper part of the condenser contiguous to the steam inlet where the steam first comes in contact with the water tubes, a somewhat less active zone with water of somewhat less velocity in the middle, and a lowermost inactive zone where there is a comparatively slight expenditure of energy in forcing the water through the tubes. This arrangement of the partitions is suitable also to comparatively light loads of steam when the water is not so cold, for instance, in spring or autumn.

Figure 6:
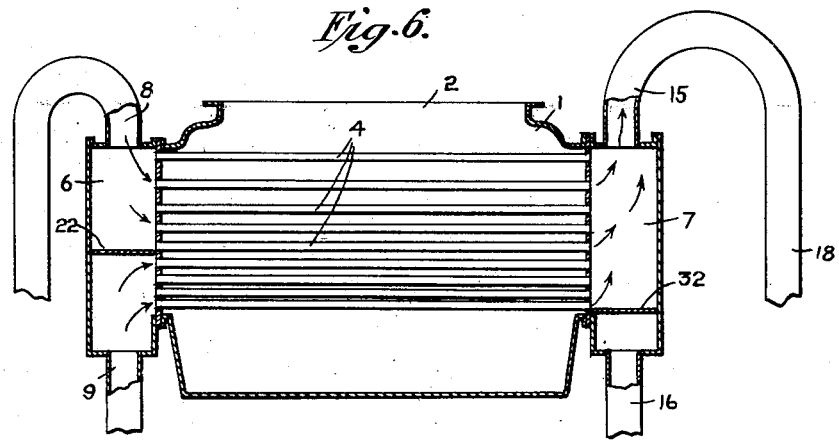

In Fig. 6 is shown an arrangement of partitions suited to warm water, or a very heavy load of steam. In this case the partition 22 is considerably farther down than in Fig. 5, and a large number of tubes are included in the more active zone. Here, too, there are only two zones, the less active zone taking all the tubes below the partition 22, the partition 32 being in its lowermost possible position with all the water passing out through the discharge pipe 15, the cooling water in this case being taken in through the inlet conduits 8 and 9, as in Fig. 5. The active zone here is of larger size, due to the higher temperature of the water, or to the heavier load, while the less active zone is also large, the velocity through all the tubes in this zone being greater than the velocity through the lowermost zone in Fig. 5.

Figure 7:
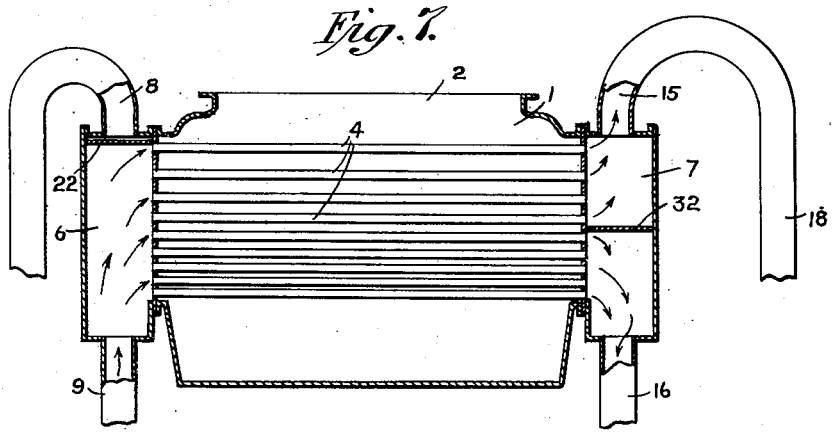

Fig. 7 shows another way of operating a condenser when the water is cold, for instance, in winter weather, the inlet conduit 8 being shut off entirely and the water coming through conduit 9, a less active zone being formed in the pipes below the partition 32 by throttling the outlet through the pipe 16 which may be accomplished by partly closing a valve in the pipe 16.

In this case the velocity through the tubes of the upper zone is not as great as the arrangement shown in Fig. 5 but the zone is of larger area, and a considerable economy of power in operating the pumping system can be secured by using only the one pump under such conditions. A similar effect could likewise be obtained by using only the pump 10 and moving the partition 22 to the bottom of the inlet chamber 6.

Figure 8:
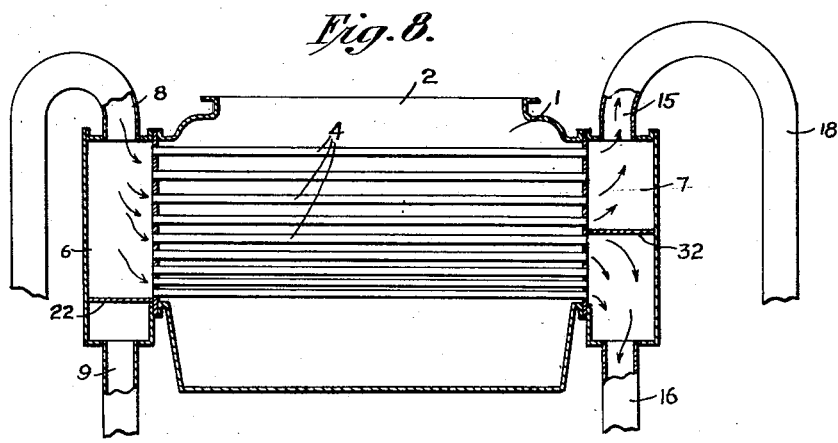

Fig. 8 shows the reverse of this arrangement, in which the partition 22 is lowered to its extreme position and all of the water being admitted through conduit 8. The operation of the condenser is identical with that shown in Fig. 7, and has the same advantages.

The most effective positions for the partitions under this condition are best secured by readings of the difference in temperature of the water emerging from the uppermost and lowermost tubes in each zone. For instance, if the condenser was operating effectively with the partitions arranged as in Fig. 5 there should be a slight difference between the temperatures of the water discharged from the upper and lower tubes of each zone. If the water coming from the lowermost tubes is of exactly the same temperature as that coming from the higher tubes, it indicates that the active zone can advantageously be made larger, and in such a case the partitions should be moved down to increase the size of the more active zone. These temperatures can be obtained by a series of thermometers 48 placed in convenient positions, for instance, along the side of the chamber 7, indicated by plugs 48$^a$ and 48$^b$. By observation of these thermometers the positions of the partitions 22 and 32 can be so adjusted that the temperature difference between the upper and lower tubes at the exhaust end of each zone is retained at a reasonable amount, it being obvious that if there were too great a temperature difference between the upper and lower tubes it would indicate that the lower tubes were entirely inactive and need not have such a high velocity of the water passed through them.

In Fig. 9 is shown a form in which the regulation of the size of the more and less active zones is automatically adjusted by means of this temperature difference, more tubes being included in the more active zone when the temperature difference becomes smaller, and vice versa.

A simple form of partition construction is illustrated, the partition 22 being omitted and only partition 32 retained, the throttle valve 21 being utilized to cut down the velocity of the water passing through the tubes which happen to be below the partition 32. The resistance thermometers 48 and 49, diagrammatically indicated, are placed, respectively, at the opening of the uppermost row of tubes in exhaust chamber 7 and on the partition 32. These form, respectively, T—1 and T—2, of a movable Wheatstone bridge device 50, shown in Fig. 10, the portions of which consist of resistance coils A and B and a slide S on which the sliding element D can be adjusted to allow for any desired slight temperature difference between T—1 and T—2. A sufficient additional variation in the temperature difference between T—1 and T—2 will throw the needle 51 of the galvanometer 52 against contact point 53 or contact point 54 causing the three-phase motor 55 which takes the place of the handle 28 in the manually operated form shown in Figs. 1 to 4 to revolve either one way or the other to reëstablish the necessary minimum temperature difference. This regulating mechanism is a well known form of device for maintaining an adjustment in accordance with a given temperature difference, and for the purposes of this invention need not be further explained. Suffice it to say that any automatic means may be employed which will position the partition 32 so that a constant small difference of temperature will be maintained between the water surrounding the thermometers 48 and 49. Although the primary function of the movable partitions is to divide the condenser into zones of greater and less activity and to vary the relative proportions of these zones in accordance with operating conditions, a further valuable utilization can be made of them in the cleaning of the tubes of the coating of foreign matter which gathers to a greater or less extent on the inside of the condenser tubes. In the ordinary practice this coating is removed by a number of methods, during which the operation of the condenser has to be suspended for a considerable length of time. These ways consist of passing steam through the condenser without passing water through the tubes and baking the coating on the inside of the tubes so that it will flake off and be removed when water is passed through again, or by removing the ends of the condenser and forcing air or water through at high velocity, either with or without some form of cleaning tool, scraper, or abrasive substance.

By the use of the partitions in the inlet and outlet water chambers of a modification of my invention such as shown in Figs. 1 to 4, the coating on the tubes can be cleaned out by water at very high velocity, which can be obtained, for instance, by placing the partition 22 above the uppermost row of tubes and the partition 32 immediately below them at their opposite end and closing the valve 21 and pumping water by means of the pump 11. This will make the uppermost row of tubes the sole discharge for the pump, resulting in a very high velocity, which will clean out this row of tubes. The partitions can then be moved down step by step, treating each row of tubes in the same manner, and by a comparatively frequent employment of this method of cleaning the tubes can be kept entirely free from the undesirable coating. This operation can be effected in a very short time without dismantling or changing the condenser in any way, and, indeed, can be carried on, under any condition, while the condenser is being used.

Although I have shown and described in the present application a condenser in which the energy expended for increasing the activity of the more active zones is expended for the production of a higher velocity, the agitation of the water necessary to get a higher degree of conductivity being produced by this increased velocity, it is obvious that other well known methods of producing such agitation, such as the use of cores in the tubes, the use of smaller tubes and tubes of irregular formation, could be substituted without invention in the present condenser, such tubes producing a similar effect and requiring a similarly increased expenditure of energy to force the water through them, as is required in the present case, to increase the velocity. The increase in the velocity is, however, my preferred form of the invention, as this furnishes at the same time a greater amount of water to effect the cooling, the more active zones thus being more effective not only by reason of their increased conductivity from tube wall to water, but also by reason of the increased amount of cooling water passing through.

A further important feature of my invention is the placing of the tubes in the upper rows of the condenser evenly without preferential lanes for steam flow, and at greater distances than those in the bottom rows, the distance apart being decreased progressively from top to bottom. I have found that it is desirable, for example, to use one-half or one-third as many tubes arranged on greater spaces through which the same quantity of water is pumped as through twice or thrice the number of tubes crowded into the same space. The steam reaches all of the tubes with less loss of absolute steam pressure and hence higher average steam temperature and rate of heat transfer from steam to the outside of the condenser tubes. The limiting construction would be a condenser in which all the water was forced through a single row of tubes on which all the steam was condensed, in which case there would be no loss of absolute pressure and lowering of the average steam temperature. The present construction approximates this ideal.

It is to be understood that the present showing and description disclose only certain specific embodiments of my present invention, and that other forms and modifications are included within the spirit and scope of the invention, as expressed in the appended claims.

What I claim is:

1. A surface condenser comprising spaced apart water chambers, tubes connecting said chambers, inlet and outlet connections for said chambers, an element in one of said chambers for dividing the flow of fluid through said tubes into two streams and means for varying the position of said element to vary the relative number of tubes carrying the said streams.

2. A surface condenser comprising spaced apart water chambers, tubes connecting said chambers, inlet and outlet connections for said chambers, a partition in one of said chambers dividing the fluid flowing through said tubes into two streams, and means to move said partition to vary the relative number of tubes carrying each stream.

3. A surface condenser comprising inlet and outlet water chambers and tubes connecting said chambers, inlet pipes in said inlet chambers, a partition across said chamber between said inlet pipes, outlet pipes from said outlet chamber, a partition across said outlet chamber between said outlet pipes and means to move said partitions with varying operative conditions.

4. A surface condenser comprising inlet and outlet water chambers and tubes connecting said chambers, inlet pipes into said inlet chambers, a partition across said chamber between said inlet pipes, outlet pipes from said outlet chamber, a partition across said outlet chamber between said outlet pipes, and means to move one of said partitions with varying operative conditions.

5. A surface condenser comprising spaced water chambers, tubes connecting said chambers, inlet and outlet connections for said chambers, a partition in one of said chambers, and means for moving said partition in said chamber.

6. A surface condenser comprising an inlet water chamber and an outlet water chamber, tubes connecting said chambers, means for supplying water to said inlet chamber, two conduits for exhausting water from said outlet chamber, a partition in said outlet chamber between said conduits and means for moving said partition to vary the relative number of tubes discharging into each conduit, one of said conduits being provided with means for increasing the resistance to the water flowing therethrough.

7. In a surface condenser, comprising inlet and outlet water chambers and tubes connecting said chambers, a steam inlet, two outlet conduits from said outlet chamber, a partition between said outlet conduits, a motor for moving said partition and means for operating said motor to vary the position of said partition with the variation of temperature difference of the water in the tubes contiguous to said steam inlet and to said partition.

8. In a surface condenser, a condensing chamber, a steam inlet into said chamber and a steam outlet therefor, water tubes traversing said chamber, said tubes being evenly spaced across said chamber and placed farther apart near said steam inlet than near said steam outlet and means for passing water at a higher speed through said widely spaced tubes than through more closely spaced tubes.

9. In a surface condenser, a condensing chamber, steam inlet and exhaust conduits therefor, tubes traversing said chamber across the path of steam flow, said tubes being placed progressively nearer each other from steam inlet to outlet, and means for passing water through those tubes near the steam inlet conduit at a higher speed than through tubes nearer the steam outlet conduit.

10. A surface condenser comprising spaced water chambers, tubes connecting said chambers, inlet and outlet connections for said chambers, partitions in said chambers and means to adjust said partitions to permit fluid to pass through a single row of tubes at high velocity to clean said tubes.

11. A surface condenser comprising spaced water chambers, tubes connecting said chambers, inlet and outlet connections for said chambers, partitions in said chambers, and means to adjust said partitions to permit fluid to pass through a single row of tubes at a time at high velocity to clean said tubes and means to continue said operation throughout said condenser.

In testimony whereof, I have hereunto set my hand.

PAUL A. BANCEL.